United States Patent
Valeri

(10) Patent No.: US 7,027,246 B2
(45) Date of Patent: Apr. 11, 2006

(54) METHOD FOR SERVO PATTERN APPLICATION ON SINGLE-SIDE PROCESSED DISKS IN A MERGED STATE

(75) Inventor: Thomas M. Valeri, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 380 days.

(21) Appl. No.: 10/435,295

(22) Filed: May 9, 2003

(65) Prior Publication Data
US 2004/0013011 A1 Jan. 22, 2004

Related U.S. Application Data
(60) Provisional application No. 60/378,973, filed on May 9, 2002.

(51) Int. Cl.
G11B 5/86 (2006.01)

(52) U.S. Cl. .............................. 360/48; 360/16; 360/75
(58) Field of Classification Search ................ 360/48, 360/75, 15–17
See application file for complete search history.

(56) References Cited

U.S. PATENT DOCUMENTS

| | | | |
|---|---|---|---|
| 4,573,851 A | 3/1986 | Butler | 414/404 |
| 4,676,008 A | 6/1987 | Armstrong | 34/237 |
| 4,694,778 A | 9/1987 | Learn et al. | 118/728 |
| 4,695,217 A | 9/1987 | Lau | 414/404 |
| 4,819,579 A | 4/1989 | Jenkins | 118/728 |
| 4,840,530 A | 6/1989 | Nguyen | 414/404 |
| 4,856,957 A | 8/1989 | Lau et al. | 414/404 |
| 4,947,624 A | 8/1990 | Cones, Sr. et al. | 53/540 |
| 4,947,784 A | 8/1990 | Nishi | 414/404 |
| 4,958,982 A | 9/1990 | Champet et al. | 414/751.1 |
| 4,981,222 A | 1/1991 | Lee | 211/41 |
| 4,987,407 A | 1/1991 | Lee | 340/540 |
| 5,007,788 A | 4/1991 | Asano et al. | 414/416.09 |
| 5,111,936 A | 5/1992 | Kos | 206/334 |
| 5,125,784 A | 6/1992 | Asano | 414/404 |
| 5,188,499 A | 2/1993 | Tarng et al. | 414/404 |
| 5,314,107 A | 5/1994 | D'Aragona et al. | 228/116 |
| 5,430,992 A | 7/1995 | Olson | 53/399 |
| 5,486,134 A | 1/1996 | Jones et al. | 451/209 |
| 5,620,295 A | 4/1997 | Nishi | 414/416.11 |
| 5,820,449 A | 10/1998 | Clover | 451/287 |
| 5,906,469 A | 5/1999 | Oka et al. | 414/416 |
| 5,976,255 A | 11/1999 | Takaki et al. | 118/500 |
| 6,033,522 A | 3/2000 | Iwata et al. | 156/345 |
| 6,107,599 A | 8/2000 | Baumgart et al. | 219/121.77 |
| 6,345,947 B1 | 2/2002 | Egashira | 414/225.01 |

(Continued)

FOREIGN PATENT DOCUMENTS

| | | | |
|---|---|---|---|
| EP | 0 177 073 | 8/1985 | |
| EP | 0 192 244 | 2/1986 | |
| EP | 768704 | 4/1997 | 414/416.02 |
| JP | 7-263521 | 10/1995 | 414/416.02 |
| JP | 08273210 | 10/1996 | |
| JP | 2001232667 | 8/2001 | |

OTHER PUBLICATIONS

Mar. 12, 2005 Invitation to Respond to Written Opinion from Intellectual Property Office of Singapore to Tan Jin-hwee, Eunice & Lim, Chooeng.

Primary Examiner—David Hudspeth
Assistant Examiner—Varsha A. Kapadia
(74) Attorney, Agent, or Firm—Sheridan Ross P.C.

(57) ABSTRACT

Methods and apparatus are provided for creating servo-tracks on the R-side of single-sided hard memory disks. The method includes placing two single-sided disks in a concentric contact merge orientation with the R-side of each disk facing outwardly. Two independent servo-track writers then position an independent transducer proximate each R-side and write desired servo-track data to the R-side surface of each disk. The disks are de-merged and either disk may be placed in any single-sided disk drive.

21 Claims, 3 Drawing Sheets

U.S. PATENT DOCUMENTS

| | | | |
|---|---|---|---|
| 6,354,794 B1 | 3/2002 | Sato et al. | 414/811 |
| 6,368,040 B1 | 4/2002 | Yamasaki et al. | 414/222 |
| 6,457,929 B1 | 10/2002 | Sato et al. | 414/404 |
| 6,582,279 B1 | 6/2003 | Fox et al. | 451/37 |
| 6,612,801 B1 | 9/2003 | Koguchi | 414/416.02 |
| 6,626,744 B1 | 9/2003 | White et al. | 451/66 |
| 2002/0159177 A1 * | 10/2002 | Aoki et al. | 360/47 |
| 2003/0208899 A1 | 11/2003 | Grow et al. | 29/458 |
| 2003/0209389 A1 | 11/2003 | Buitron et al. | 184/6 |
| 2003/0209421 A1 | 11/2003 | Buitron et al. | 204/192.2 |
| 2003/0210498 A1 | 11/2003 | Kim et al. | 360/135 |
| 2003/0211275 A1 | 11/2003 | Buitron et al. | 428/64.1 |
| 2003/0211361 A1 | 11/2003 | Kim et al. | 428/694 R |
| 2004/0016214 A1 | 1/2004 | Buitron | 53/474 |
| 2004/0035737 A1 | 2/2004 | Buitron et al. | 206/454 |
| 2004/0068862 A1 | 4/2004 | Buitron et al. | 29/604 |
| 2004/0069662 A1 | 4/2004 | Buitron et al. | 206/307.1 |
| 2004/0070092 A1 | 4/2004 | Buitron et al. | 264/1.33 |
| 2004/0070859 A1 | 4/2004 | Crofton et al. | 360/1 |
| 2004/0071535 A1 | 4/2004 | Crofton et al. | 414/416.09 |

* cited by examiner

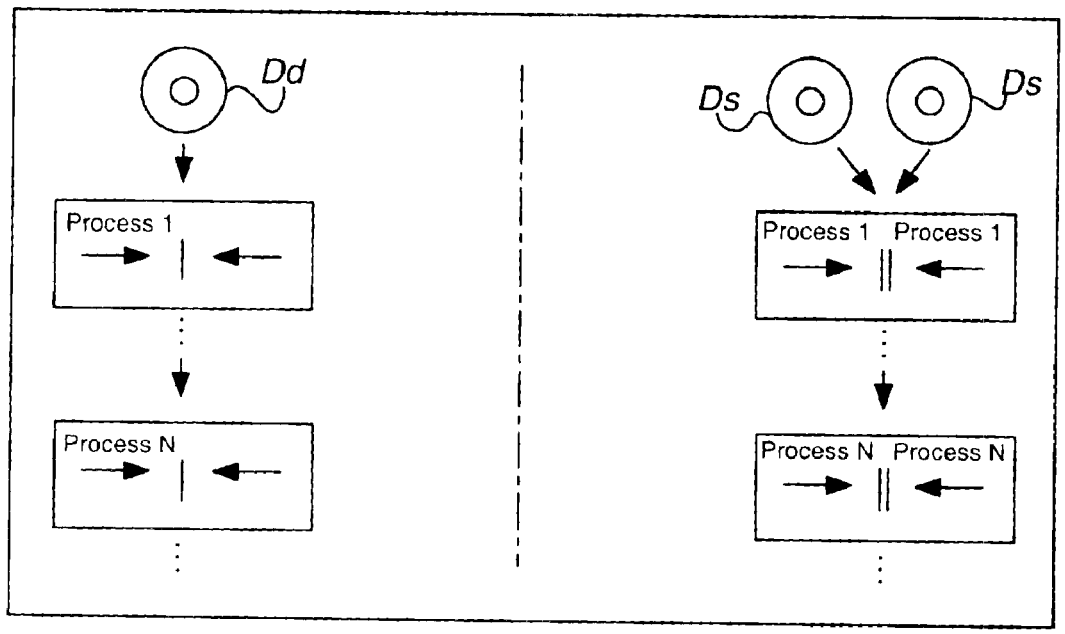
FIG. 1
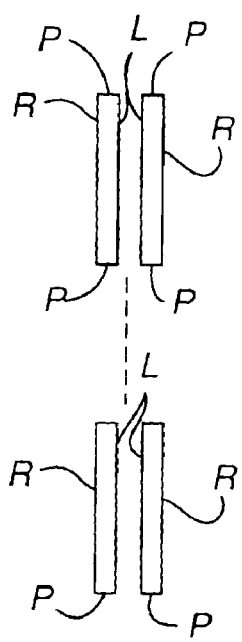  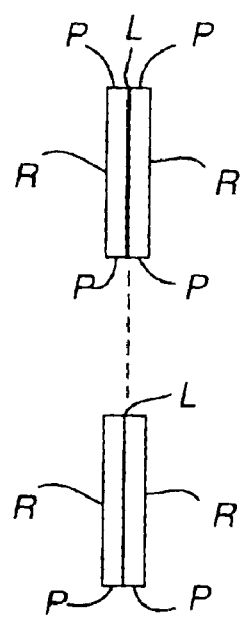  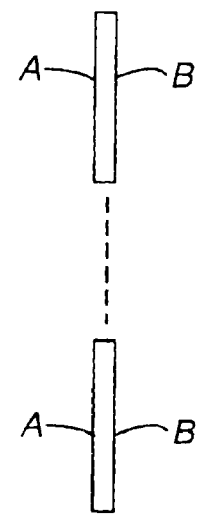
FIG. 2    FIG. 3    FIG. 4

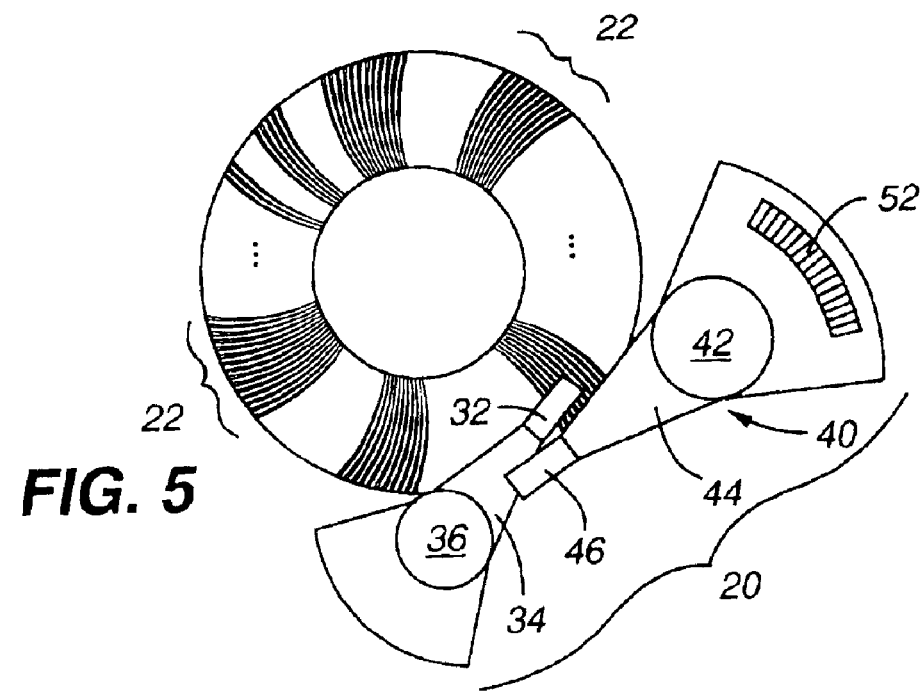
FIG. 5
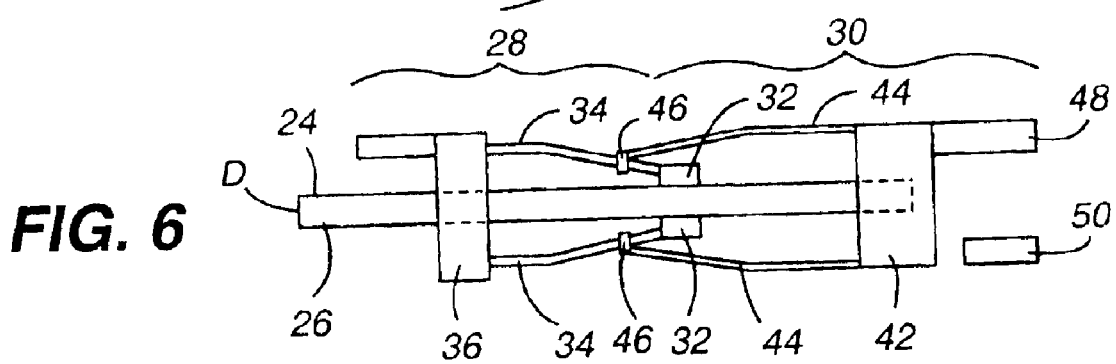
FIG. 6
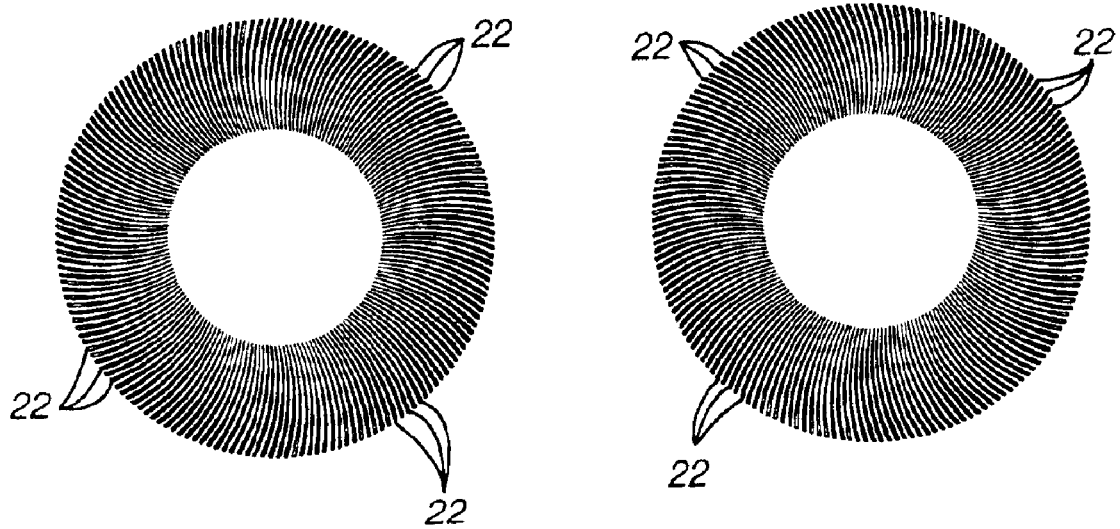
FIG. 7  FIG. 8

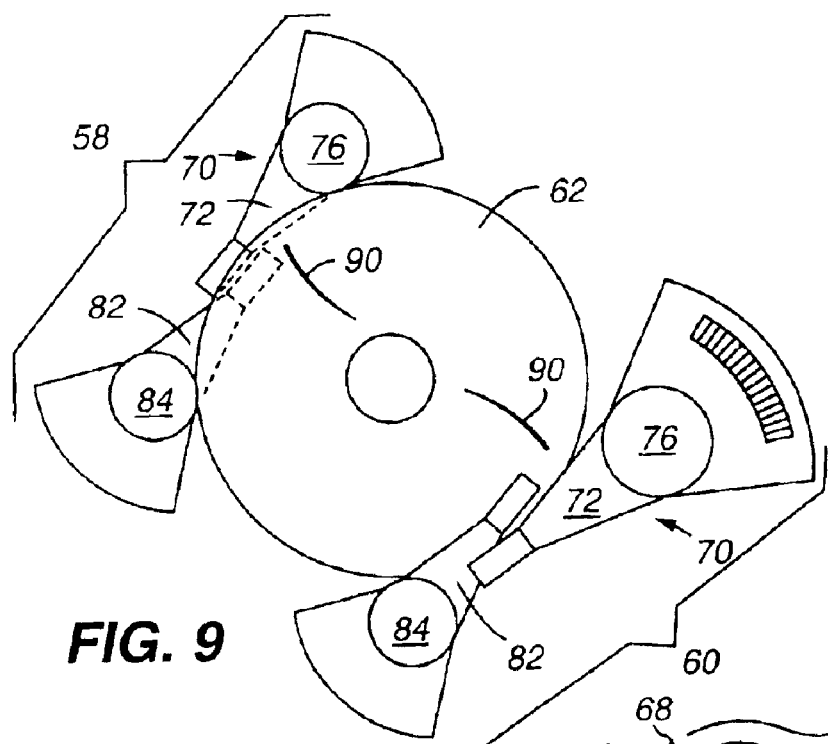
FIG. 9
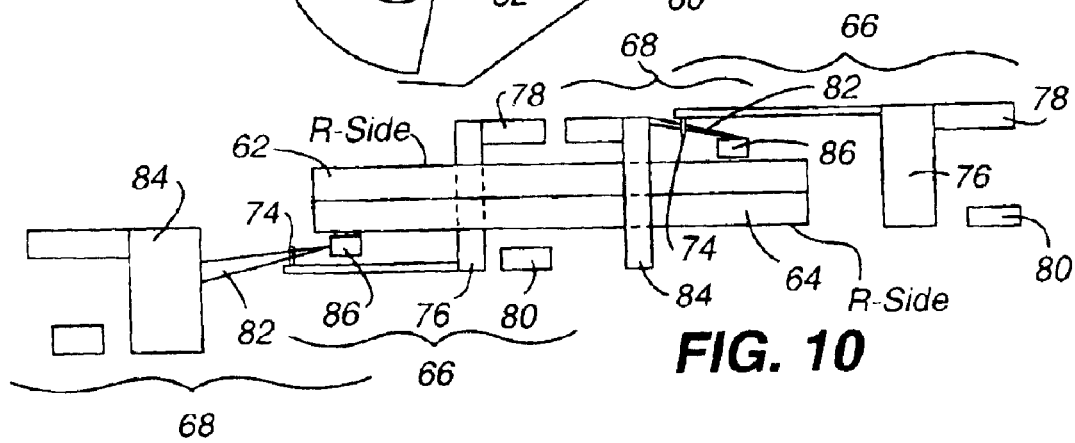
FIG. 10
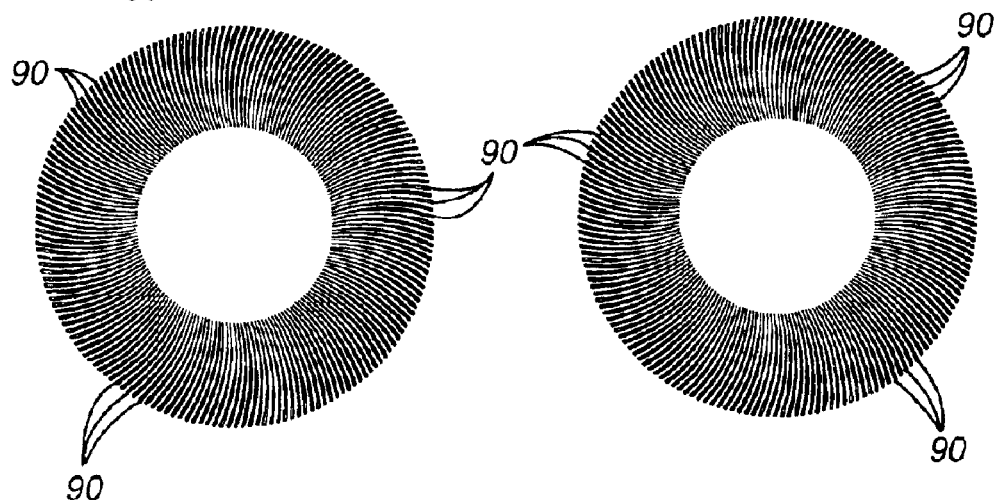
FIG. 11  FIG. 12

METHOD FOR SERVO PATTERN APPLICATION ON SINGLE-SIDE PROCESSED DISKS IN A MERGED STATE

CROSS REFERENCE TO RELATED APPLICATION

Priority is claimed from U.S. Provisional Patent Application Ser. No. 60/378,973 filed May 9, 2002, which is incorporated by reference herein in its entirety.

The subject matter of the present application is related to the following applications, each of which has a filing date of May 9, 2003: application Ser. No. 10/434,550 entitled Single-Sided Sputtered Magnetic Recording Disks to Clasara et al. (Publication No. US-2003-0211361-A1); application Ser. No. 10/435,361 entitled Dual Disk Transport Mechanism Processing Two Disks Tilted Toward Each Other to Grow et al. (Publication No. US-2003-0208899-A1); application Ser. No. 10/435,358 entitled Information-Storage Media With Dissimilar Outer Diameter and/or Inner Diameter Chamfer Designs On Two Sides to Clasara et al. (Publication No. US-2003-0210498-A1); application Ser. No. 10/435,360 entitled Method of Merging Two Disks Concentrically Without Gap Between Disks to Buitron (Publication No. US-2004-0016214-A1); application Ser. No. 10/434,551 entitled Apparatus for Combining or Separating Disk Pairs Simultaneously to Buitron et al. (Publication No. US-2004-0035737-A1); application Ser. No. 10/435,572 entitled Method of Simultaneous Two-Disk Processing of Single-Sided Magnetic Recording Disks to Buitron et al. (Publication No. US-2003-0211275-A1); application Ser. No. 10/435,161 entitled W-Patterned Tools for Transporting/Handling Pairs of Disks to Buitron et al. (Publication No. US-2003-0209421-A1); application Ser. No. 10/434,547 entitled Method for Simultaneous Two-Disk Texturing to Buitron et al. (Publication No. US-2004-0070092-A1); application Ser. No. 10/435,227 entitled Cassette for Holding Disks of Multiple Form Factors to Buitron et al. (Publication No. US-2004-0069662-A1); application Ser. No. 10/434,546 entitled Automated Merge Nest for Pairs of Magnetic Storage Disks to Crofton et al. (Publication No. US-2004-0071535-A1); application Ser. No. 10/435,293 entitled Apparatus for Simultaneous Two-Disk Scrubbing and Washing to Crofton et al. (Publication No. US-2004-0070859-A1); application Ser. No. 10/435,362 entitled Cassette Apparatus for Holding 25 Pairs of Disks for Manufacturing Process to Buitron et al. (Publication No. US-2004-0068862-A1); and application Ser. No. 10/434,540 entitled Method of Lubricating Multiple Magnetic Storage Disks in Close Proximity to Buitron et al. (Publication No. US-2003-0209389-A1). Each of these applications is incorporated by reference in its entirety as if stated herein. All of these applications are commonly owned by the Assignee.

FIELD OF THE INVENTION

The present invention relates to the creation of patterns of data on media prior to drive assembly. It has particularly useful application in creating or writing servo patterns on pairs of contact merge single-side hard memory disks in a manner that the pattern on each of the two disks will be uniformly oriented.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is performed on an entire cassette of disk devices at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives and then subjected to servo writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_d$, depicted on the left side of FIG. 1, versus the simultaneous processing of two single-sided disks $D_s$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.
d) "Disk" means a finished memory disk and all predecessor configurations during the manufacturing process starting with a substrate disk and progressing to a finished memory disk, depending upon the context of the sentence in which it is used.
e) "Disk pair" or "substrate pair" means two disks positioned in contact merge, gap merge or spacer merge orientation.
f) "Double-sided disk" means a single disk which has been subjected to double-sided processing, whether or not both sides of the disk have passed testing or only one side has passed testing.
g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.
h) "Single-sided disks" means a single disk which has been subjected to single-side processing, where only one surface of the disk is fully processed.
i) "Spacer merge" means a spacer body is used to create spacing between two gap-merged disks.
j) "Contact merge" means a merged pair of disks where the inside surface of each disk is in contact with the inside surface of the other disk. Contact merge includes concentric and non-concentric merge.
k) "Concentric merge" means that two merged disks have the same axis and, assuming the two disks have the same outside diameter and inside diameter (as defined by the center aperture), their outer and inner perimeter edges are aligned.
l) "Concentric contact merge" means a pair of disks that are oriented in both a contact merge and a concentric merge.
m) "Non-concentric merge" or "off-centered merge" means the two merged disks are not concentric to each other or their perimeter edges are not aligned.
n) "Non-concentric contact merge" means the two contact merged disks are not concentric to each other or their perimeter edges are not aligned.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

Current servo-writers are designed to write servo-patterns on both surfaces of double-sided disks simultaneously. Typically, a single actuator assembly is used to position a transducer or head proximate each surface of the double-sided disk. The transducers move in unison as the single actuator assembly moves. When the double-sided disk is subsequently installed in a finished disk drive, the servo-tracks will effectively communicate position information relative to both surfaces of the disk because the read/write transducer for each surface will be positioned by a single actuator assembly.

Servo-writers designed for double-sided disks are not effective or efficient for writing servo-tracks on the R-side of single-sided hard memory disks. If two single-sided disks were positioned in a contact merge orientation and placed in a servo-track writer for double-sided disks, the respective servo patterns on the R-side of each disk would be opposite or backwards relative to each other. Thus, when the pair of disks are removed from the servo-writer and demerged for placement in different disk drives, one of the disks will be unusable because the read/write transducer and actuator assembly of the disk drive will not be able to follow the servo-tracks. Alternatively, one single-sided disk could be placed in the double-sided disk servo-track writer, but this would be an inefficient use of the equipment. The transducer positioned adjacent the L-side surface, the machine surface, would be unused. Therefore, the output or productivity of the servo-writer would be substantially reduced.

SUMMARY OF THE INVENTION

These and other needs are addressed by the various embodiments and configurations of the present invention. In one embodiment, the present invention provides a method and apparatus for simultaneously writing a servo pattern on the exterior surface (R-side) of a pair of disks in a concentric contact merge orientation prior to asembly in a disk drive. By utilizing a separate servo-track writing transducer for each disk, and by correctly positioning each servo-track writing assembly based upon the orientation of the disk surface, uniform and consistent servo-tracks can be created on each disk. The two disks may be demerged and either can be used in any single-sided disk drive. This reduces cost and increases through-put of the manufacturing process.

In a second embodiment, the desired servo-track pattern can be created utilizing a template having a preformed magnetic pattern. Applying this template to the R-side of each single-sided disk will create a magnetic pattern consistent with a partial or complete set of servo-tracks. If partial servo patterning is performed, the remaining servo-track data may be filled in by the read/write transducer of the disk drive performing self-servo writing.

A third embodiment also utilizes a template for creating a desired servo-track pattern. The template comprises transparent and opaque sections which permit laser light to pass through the template or be blocked by the template, respectively. The laser light that does access the disk will reduce the coercivity of the exposed portions of the magnetic layer of the disk to a low enough level such that the application of an external magnetic field will magnetize the reduced coercivity areas but not the areas which are not heated or altered by the laser beam, thereby creating a servo pattern. A full or partial servo pattern can be created. If a partial pattern is created, the disk drive may fill in the remainder using self-servo writing techniques.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 1 is a schematic of a double-sided disk manufacturing process and a single-sided disk manufacturing process including process steps 1 through N.

FIG. 2 is a cross-section of a pair of gap merged disks.

FIG. 3 is a cross-section of a pair of concentric contact merged disks.

FIG. 4 is a cross-section of a conventional double-sided processed disk.

FIG. 5 is a top plan view of a conventional servo-writing apparatus used with a single, double-sided disk.

FIG. 6 is an elevational view of the apparatus illustrated in FIG. 5.

FIG. 7 is an example of a servo-pattern written on the upper surface of a disk by the apparatus illustrated in FIGS. 5 and 6.

FIG. 8 is an example of a servo-pattern written on the lower surface of a disk by the apparatus illustrated in FIGS. 5 and 6.

FIG. 9 is a top plan view of a servo-writing apparatus of the present invention used with a pair of merged disks.

FIG. 10 is an elevational view of the apparatus illustrated in FIG. 9.

FIG. 11 is an example of a servo-pattern written on the outer surface of the upper disk of a pair of disks by the apparatus illustrated in FIGS. 9 and 10.

FIG. 12 is an example of a servo-pattern written on the outer surface of the lower disk of a pair of disks by the apparatus illustrated in FIGS. 9 and 10.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

A servo-writer apparatus 20 for a single double-sided disk with two functional or active surfaces, shown in FIGS. 5 and 6, simultaneously writes servo-tracks 22 on both surfaces 24 and 26 of the single double-sided disk D. The servo-writer apparatus comprises two separate actuator assemblies 28 and 30. Typically, one actuator assembly is used to control and position the other actuator assembly relative to the surfaces of the disk. More specifically, the first actuator assembly 28 includes a pair of transducers or read/write elements 32 connected by actuator arms 34 to a single pivot point or shaft 36, with one head positioned adjacent the upper surface 24 and the other head positioned to interact with the lower surface 26. The write element or transducer 32 writes servo-tracks 22 on both the upper and lower surfaces of the disk and both surfaces are active or functional for memory storage. The two transducers 30 write the servo-tracks 22 onto the surfaces of the disk D in an arcuate pattern as the two transducers 30 pivot about the single axis 34. In this arrangement, when writing servo-track data on a double-sided disk, it is critical that the two transducers 30 share a common pivot point and move along a common arc of motion. This is because, once the disk is installed in a disk drive, the heads that will be used to read from and write to the surfaces 24 and 26 of the disk D will also share a common pivot point and will move in unison just like the servo-track writer. Indeed, one method of servo-track writing involves using the head/actuator assembly of the disk drive to write the servo-tracks after assembly of the disk drive. This technique is known as self-servo writing. The servo pattern 22 created on the two surfaces 24 and 26 of the double-sided disk is shown in FIGS. 7 and 8, respectively.

In this embodiment, the second actuator assembly 30 includes an encoder 40 to position the transducers 30 of the first actuator assembly 28 relative to the surfaces of the disk. The encoder 40 includes a single shaft or pivot point 42 for a pair of actuator arms 44. A push pin 46 is disposed at the distal end of the actuator arms 44. A voice coil motor, generally including a coil element 48 and permanent magnet 50, is positioned at the opposite end of the actuator arms. A scale or gauge 52 may also be included as part of the voice coil motor. In this master/slave arrangement, the voice coil motor for the second actuator assembly 30 causes the actuator arm 44 and push pin 46 to rotate about pivot point 42. In turn, this causes actuator arm 34 to pivot about shaft 36 due to the contact of push pin 46 on actuator arm 34. This relative movement positions transducers 32 relative to disk surfaces 24 and 26. Thus, the voice coil motor of the second actuator assembly 30 indirectly positions the heads 32 of the first actuator assembly 28 at the proper location to create the desired servo-tracks. The first actuator assembly 28 may also include a voice coil motor, but it would be inactive during this servo track writing operation.

Such a servo-track writing apparatus will not work for servo-track writing on a pair of single-sided disks in a merge orientation. As previously noted, FIGS. 7 and 8 show exemplary servo patterns for the upper and lower surfaces 24 and 26 of the single double-side disk shown in FIGS. 5 and 6. As can be seen, the patterns created by the tracks 22 are opposite in their direction or orientation. Thus, if the same apparatus were used for writing servo-tracks on the active surfaces (R-side) of a pair of merged disks, the lower disk would not be functional in a conventional disk drive, as the servo patterns would not be positioned in a manner that could be read and understood by a conventionally mounted head disk assembly.

The foregoing problems are overcome by the apparatus and method shown in FIGS. 9 and 10. Therein, two servo-track writers 58 and 60 are utilized, with one being positioned for writing on the outer surface (the R-side) of the top disk 62 and the second for writing on the outer surface (R-side) of the lower disk 64. As can be seen, the components of the servo-track writing apparatus 58 and 60 are identical to those used for conventional servo-track writing on a single double sided disk except, each set of servo-track writers pivot at different locations, rather than a common location.

More specifically, as illustrated in FIGS. 9 and 10, each servo-track writing apparatus 58 and 60 includes a master actuator assembly 66 for positioning a slave actuator assembly 68 which performs the actual servo-writing. The master actuator assembly 66 includes a positioning encoder 70 having a single actuator arm 72 with a push pin 74 disposed at the distal end of the actuator arm 72. The opposite end of the actuator arm includes a voice coil motor which directly positions the actuator assembly 66, including pin 74. The actuator arms pivot about a shaft 76. The voice coil motor includes a coil 78 and a permanent magnet 80. The coil is energized under the direction of a controller, not shown, to position the push pin relative the surface of the disks.

The servo-track writing apparatus further includes a second actuator assembly 84. This second or slave actuator assembly 68 includes an actuator arm 82 which pivots about a shaft 84. A read/write element or transducer 86 is positioned at the distal end of the actuator arm 82. The transducers 86 write the servo-tracks under the positional guidance of the encoder actuator assembly 66. Thus, the encoder actuator assembly 66, under the direction of a controller, not shown, move the actuator arms 72 and push pins 74 to position the transducers 86 at desired locations relative to the R-side of disks 26 and 68. The transducers 86 write the desired servo-tracks on the disk surfaces.

The slave actuator assemblies 68 may also include voice coil motors, but they would be inactive during the servo-track writing procedure. In addition, it is preferred that the shafts 76 and 84 use air bearings rather than ball bearings. Air bearings are smoother and introduce less vibration into the actuator arms 72 and 82 than would ball bearings. As shown in FIG. 10, it is preferred that the disks be in a concentric contact merge orientation, although a concentric gap merge or concentric spacer merge orientation would also be successful.

An example of the servo-track pattern 90 created by servo-track writing apparatus 58 and an example of servo-track pattern 92 created by servo-track writing apparatus 60 is shown in FIG. 9. A full set of servo-track patterns 90 and 92 are shown in FIGS. 11 and 12, respectively. As can be seen in FIGS. 11 and 12, and in contrast to FIGS. 7 and 8, the servo-track patterns 90 and 92 are similarly oriented. Accordingly, the disks shown in FIGS. 9 and 10 can be used interchangeably in the same single-sided disk drive for recording because the servo-track patterns 90 and 92 are consistent.

In the preferred embodiment, the encoders 70 include a laser positioning device, not shown. The laser positioning device establishes a known initial position, such as defining a crash stop for the actuator arms 72 as a "zero" position. The voice coil motors for the encoder actuator assembly 66, in combination with the laser positioning device, can incrementally adjust the position of the transducers 86 to create the desired servo-track pattern. Laser position devices such as these are known to those of skill in the art. In addition, an advantage of having the second set of voice coil motors associated with the second or slave actuator assemblies 68 is that once a sufficient number or volume of servo-tracks 90 and 92 are created, the encoders 70 can disengage and move out of the way of the second actuator assemblies. The voice coil motors associated with the second or slave actuator assemblies can then position the transducers 86 relative to the R-side surfaces of disks 62 and 64, utilizing the previously written servo-tracks, and fill in or create the remaining needed servo-tracks or can be used as a test or double-check of the previously written servo-tracks before removing the disks from the apparatus.

In addition to the methods and apparatus discussed above, at least two alternative methods and apparatus exist for creating servo-tracks on the R-sides of a pair of disks. In a first alternative embodiment, a template with a preformed magnetic pattern corresponding to the desired servo-track patterns is positioned on the R-side surface of each single-sided disk. An example of the magnetic pattern is the servo-track pattern shown in FIGS. 11 and 12. The pattern is made with permanent magnets. The magnetic pattern influences the magnetic layer on the R-side of each disk 62 and 64 to be magnetized in the desired pattern. The magnetic pattern can be partial or can be a complete set of servo-track data. The strength of the field produced by permanent magnets comprising the pattern should exceed disk coercivity or, stated differently, should be sufficient to saturate the media at the desired positions. Application of the template to the disks will likely be less than five seconds. To the extent that the template only creates a partial servo-track pattern, the remainder of the pattern can be filled in by the read/write head of the disk drive performing self-servo track writing.

A second alternative embodiment for creating servo-track patterns utilizes a laser projection technique. In this embodiment a template is also used. The template would preferably be made of glass. A desired pattern would be created using transparent and opaque sections on the glass. Opaque sections would preclude laser light from striking the disk surface and transparent sections would allow laser light to contact the disk surface. The pattern may be created using photo lithography techniques. An example of a desired pattern is the servo-track pattern shown in FIGS. 11 and 12. In a first step, a laser light would be applied of sufficient power to elevate the temperature of the exposed areas of the disk. Next, the disk surface would be exposed to a magnetic field. The magnet would magnetize the receptive portions of the disk surface whose coercivity had been altered by heating from the laser beam. This would create the desired servo-track pattern. The magnet could be a permanent or electromagnet. The strength of the magnetic field produced by the magnet would need to be less than the coercivity of the disk at room temperature, but greater than the coercivity of the disk at the elevated temperature. In other words, the laser beam would need to elevate the temperature of select portions of the disk surface high enough above room temperature that a sufficient differential in coercivity will occur on the disk surface to allow a magnetic field to alter the areas of reduced coercivity, but not the remaining areas. Once the disk surface cools from the laser heating, the magnetic pattern would be set. As with the first alternative embodiment, the pattern may be complete or partial. If a partial pattern is created, the remainder of the servo-track pattern can be filled in by self-servo track writing techniques.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing hard disks by writing servo-tracks on the hard memory disks, comprising:
   a. merging a pair of disks such that a first surface of one disk is in contact with a first surface of a second disk, the outer perimeters of the two disks are aligned, and the second surface of each disk face outwardly of the pair;
   b. writing servo-tracks on the second surface of each disk using a different write element for each disk.

2. The method of claim 1, further comprising writing servo-tracks on the second surface of each disk simultaneously.

3. The method of claim 1, further comprising separating said disks following writing servo-tracks on said disks.

4. The method of claim 1, further comprising positioning said write elements on separate actuator assemblies.

5. The method of claim 4, further comprising pivoting said actuator assemblies about separate axes.

6. A method of writing servo-tracks on hard memory disks, the disks being of substantially uniform size and shape including having a central aperture, and having memory capacity associated with a first side of the disk but no memory capability associated with the second surface, the method comprising:
   a. merging a pair of disks such that the first surfaces of each disk are in contact and the second surface of each disk is accessible by a write element;
   b. simultaneously writing servo-tracks on the second surface of each disk such that the servo-tracks on the second surface of each disk have the same pattern.

7. The method of claim 6, further comprising using a first write element for the first disk and a second write element for the second disk.

8. The method of claim 6, further comprising demerging the pair of disks following servo writing.

9. The method of claim 6, wherein merging a pair of disks comprises aligning the disks such that the outer perimeters of the disks are aligned.

10. The method of claim 6, wherein said step of merging a pair of disks comprises inserting a spindle through the central aperture of each disk.

11. A method of manufacturing hard disks by writing servo-tracks on a single surface of each of two hard memory disks simultaneously, the method comprising:
   a. positioning the pair of disks in a contact merge orientation, with a surface of each disk being accessible by a servo-writing instrument;
   b. simultaneously rotating the pair of disks in unison;
   c. positioning a first write element on a first movable actuator arm at a first location;
   d. positioning a second write element on a second moveable actuator arm at a second location;
   e. writing at least one servo-track on said surface of one disk using the first write element;
   f. simultaneously writing at least one servo-track on said surface of the second disk using the second write element.

12. The method of claim 11, further comprising selecting the first and second locations such that the pattern of servo-tracks written on each disk is the same.

13. The method of claim 11, further comprising separating the disks upon completion of the servo-track writing.

14. A method of manufacturing single-sided hard disks by writing servo-tracks on the active surface of the single-sided hard memory disks, the method comprising:
   a. positioning a pair of disks in a concentric contact merge orientation;
   b. positioning a first write element adjacent the active surface of one disk;
   c. positioning a second write element adjacent the active surface of the other disk;
   d. rotating the disk pair in unison;
   e. simultaneously writing substantially similar servo-track patterns on the active side of each disk;
   f. demerging the pair of disks.

15. A method of manufacturing single-sided hard disks by creating servo-tracks on the active surface of the single-sided hard memory disks, the method comprising:
   a. positioning a pair of disks in concentric contact merge orientation, with the active surface of each disk facing outwardly of the pair;
   b. simultaneously writing substantially identical patterns of servo-tracks on the active surface of each disk;
   c. demerging the pair of disks.

16. The method of claim 15, wherein simultaneously identical patterns of servo-tracks on the active surface of each disk comprises positioning a separate write element proximate the active surface of each disk.

17. The method of claim 16, further comprising positioning the separate write elements using separate actuator assemblies.

18. A method of manufacturing single-sided hard disks having a single active surface, the method comprising:
   a. positioning a pair of single-sided disks in back to back orientation with the active surface of each disk facing outwardly;
   b. simultaneously applying a first template having a magnetized pattern to the active surface of one disk and applying a second template having the same magnetized pattern to the active surface of the second disk;
   c. creating a servo-track pattern on the active surface of each disk substantially similar to the pattern of the template;
   d. removing the templates from the disks.

19. The method of claim 18, further comprising adding additional servo-tracks using the write element of a disk drive or servo-track writer.

20. A method of manufacturing hard memeory disks by creating servo-tracks in the active surface of the hard memory disks, the method comprising:
   a. placing a pair of disks in a contact merge orientation such that the outwardly facing surface of each disk is active;
   b. applying a template to the outwardly facing surface of each disk where the template has portions that permit light to pass through and other sections where light cannot pass through;
   c. directing a laser beam at the template;
   d. altering the coercivity of the magnetic layer of the outwardly facing surface of each disk;
   e. creating a servo-pattern on the active surface of each disk based upon the altered coercivity.

21. The method of claim 20, wherein altering the coercivity of the magnetic layer comprises reducing the coercivity.

* * * * *